March 13, 1928. 1,662,566

F. DÖHLE

TRANSMISSION MECHANISM

Filed April 4, 1922

Inventor:
F. Döhle,
By Lawrence Langner
Atty.

Patented Mar. 13, 1928

1,662,566

UNITED STATES PATENT OFFICE.

FRITZ DÖHLE, OF WILMERSDORF, NEAR BERLIN, GERMANY.

TRANSMISSION MECHANISM.

Application filed April 4, 1922, Serial No. 549,580, and in Germany April 5, 1921.

In winches which are driven by motors, rotating continuously in the same direction and essentially with the same speed, it is necessary to arrange between the motor and the winch or its direct drive a variable gearing, enabling the motor—if an explosion motor—to be started without load and to lift variable loads with different velocities corresponding to the weight of the load. Furthermore, this variable gearing must permit a compulsory retrograde motion of the winch and prevent a descending motion of the load carried by the winch, when changing the speed of the latter, this effect being obtained by putting the brake in action. Such a device ordinarily requires a great number of operating levers, which must be managed carefully and in a quite distinct order.

The present invention provides not only a convenient and simple arrangement of the several wheels for obtaining two forward speeds and a greater reverse speed, but also a solution of the above mentioned difficulties in a form necessarily simple, by employing a single lever, effecting the alteration of the velocities or their direction and the automatic engagement of the braking device in such a manner that these two operations occur always in the correct order, so that it is not possible to couple without simultaneously releasing the brake and vice versa. It is essential that the coupling device of the friction couplings act directly upon the weight or the spring operating the brake. The preferred arrangement of the pinions permitting the possibility of obtaining several gear ratios with only a few intermediate pinions is obtained by mounting the transmission shaft in the direction of the axis of the direct winch drive, so that a toothed crown and a pinion of the transmission gearing can be alternately operated from the driving shaft. There is thus obtained without the addition of change speed gears and corresponding clutches a forward and a reverse drive. Increase of the forward speed is obtained by a third pinion adapted to be coupled to act on the transmission shaft and the pinion serving as an intermediate pinion in this case serves for direct drive through the toothed crown. Thus each pinion has to serve two purposes alternately this result being obtained by the above described arrangement of the two shafts with respect to one another.

The invention is illustrated in the accompanying drawings, wherein

Figure 1:
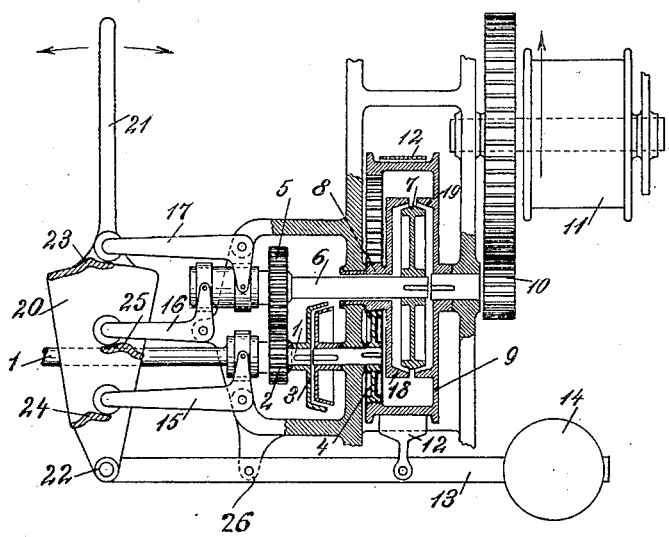
Figure 2:
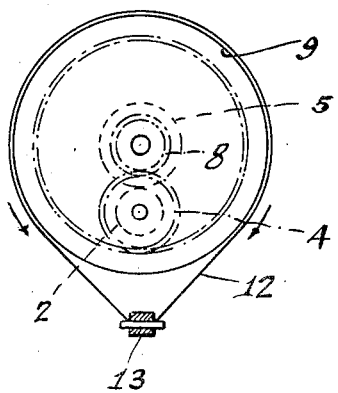

Fig. 1 is a longitudinal section in elevation, parts being shown in elevation, and Fig. 2 is a transverse section in elevation, through the brake device.

On the driving axle 1 of the motor the toothed wheel 2 and one part of the friction coupling 3 is fixed, the other part of the latter being connected with a toothed wheel 4. The toothed wheel 2 is in engagement with a toothed wheel 5, fixed upon the axle 6 of the transmission gear and connected with the coupling cone 7 of a friction coupling. On the same axle a toothed wheel 8 is loosely arranged, engaging with the toothed wheel 4. The latter meshes simultaneously with the internally-toothed wheel 9, arranged with a toothed wheel 10 on the same shaft and directly connected thereby with the drum 11 of the winch. The outer surface of the toothed wheel 9 is acted upon by the brake strap 12, actuated by a lever 13 which is operated, for example, by means of a weight 14. The friction coupling 3 is moved by the lever 15 and the coupling cone 7 is operated by the levers 16 and 17 in such a manner that it engages either with the part 18 or the part 19 of the friction coupling, the first one being connected with the toothed wheel 8, while the latter forms an internal part of the toothed wheel 9. The levers 15, 16 and 17 may be alternately moved by means of a plate 20, being provided with cams 23, 24, and 25, and with a handle 21, which may be swung to the right or left side, turning around the pin 22. This latter is arranged on an arm of the weight-operated lever 13, as a result of which the plate and handle, 20 and 21, with their cams 23, 24 and 25, on being actuated first displaces the clutch part until it comes into engagement. This coupling movement takes no power other than the friction of the separate parts on one another, i. e., it is not necessary to raise the weighted lever and weight 14. As a result the brake during this period is still in "on" position. Only on further movement of the handle 21 and corresponding cam, which is a little higher than is necessary for the coupling movement, is the arm of the weighted lever 13 depressed and the brake released, as the coupling can no longer move and the full pressure of the clutch is attained. The movement might be considered as that obtained by forcing a wedge between the weighted lever 13 and the coupling lever, the latter first yielding as it offers no resistance.

The operation of the device is as follows:

If the handle 21 and with it the plate 20 be displaced towards the right the cam 23 moves under the free end of the bell crank lever 17 which is fitted with a roller which in consequence is raised at this end and by means of its shorter arm pulls the shaft 6 towards the left. As a result the clutch member 7 mounted on the shaft 6 is coupled with the clutch member 18 and the following movement commences:—

From the shaft 1 driven by the motor is driven the pinion 2 which transmits its movement to the pinion 5 mounted on the shaft 6 and this movement in consequence of the clutching operation above described is transmitted to the small pinion 8 connected with the member 18, thence to the pinion 4 and thence to the internal toothed ring on the drum 9 which is thus driven by the shaft 1.

The movement which the lever 17 may make is limited by the small distance through which the member 7 moves in the clutching operation. As now, however, the height of the cam 23 is somewhat greater than this maximum throw of the lever 17, the plate 20 and with it the point 22 must move downwardly by an extent equal to the difference between these two amounts. As the result of this downward movement of the point 22 the lever 13 is turned about its pivot 26, the weight 14 is raised and the brake band 12 released. The pressure of the raised weight 14 is transmitted to the clutch members 7 and 18 through the lever 13, the plate 20, the cam 23 and the lever 17, and thereby holds this coupling in engagement so long as the free end of the lever 17 rests on the highest point of the cam 23.

If the handle 21 be moved further towards the right, the long arm of the bell crank lever 17 again moves downwards into the position shown in dotted lines on the cam 23 and the coupling between the members 7 and 18 released. The weight 14 moves downwards at the same time, raises the point 22 and thus the plate 20 so that the cam 23 comes in contact with the free end of the bell crank lever 17 and at the same time pulls the brake band 12 against the drum 9.

If the handle 21 be moved further towards the right the free end of the long arm of the bell crank lever 15 runs over the highest point of the cam 24 and the friction clutch 3 is thereby engaged. Because the cam 24 provides a greater movement than that required for the movement of the clutch 3 after the conclusion of the movement of the clutch 3 the plate 20 and with it the point 22 must move downwards by the amount of this excess so that the weight 14 is again lifted and the brake 12 released. If the handle 21 is again returned into the neutral position shown in the drawing the point 22 is again raised and the brake simultaneously applied.

If the drum 9 is to be rotated in the reverse direction the handle 21 is pushed towards the left. The lever 16 then bears on the cam 23 whereby the clutch member 7 is shifted to the right so that the shaft is coupled with the drum 9. Just as in the two previous instances described in consequence of the height of the cam 25 the plate 20 and therewith the point 22 are lowered, the weight 14 is raised, the brake 12 released, the pressure of the weight serving through the lever 13 and the cam 25 to hold the lever 16 in its extreme position and thereby to ensure engagement between the members 7 and 9.

In all instances the weight 14 thus acts in its raised position not only to release the brake but also to maintain the clutching pressure.

The device is shown in the drawing only diagrammatically and may be varied within the scope of the invention.

The weight 14 may also be replaced by a spring or another device, having the same effect.

I claim—

1. Transmission mechanism comprising a clutch including driving and driven elements constructed so as to be coupled together, a brake for said driven element arranged to be normally applied whenever said elements are uncoupled, and means for sequentially coupling said elements and releasing said brake, including a weight imposing a gravital pressure upon said brake for setting the same, said means being constructed to shift the pressure of said weight from said brake for releasing the same and to apply it to said coupled members for holding them together.

2. Transmission mechanism including driving elements and driven elements, said driving element being constructed and arranged to be alternately coupled with either of said driven elements, a brake for said driven elements arranged to be normally applied whenever said driving element is uncoupled from said driven elements, and means for sequentially coupling either of said elements and releasing said brake.

3. Transmission mechanism including a driving and a driven element, constructed so as to be coupled together, a brake for said driven element arranged to be normally applied whenever said elements are uncoupled, a weight imposing a gravital pressure upon said brake for setting the same, and means for sequentially coupling said elements together and releasing said brake, including a connection for operating said coupling and a lever upon which said weight is mounted, and mechanism constructed to be automatically operative when said connection is shifted to couple said elements, to shift said lever for transferring the pressure of said weight from said brake and releasing the same, to said coupled elements, holding them together.

4. Transmission mechanism comprising a clutch including driving and driven elements constructed so as to be coupled together, a brake upon said driven element arranged to be normally applied whenever said elements are uncoupled, and means for sequentially coupling said elements and releasing said brake, said brake including a brake lever, said operating member including a plate supported by said brake lever, cams on the plate for actuating said clutch means, the cams being positioned so that the brake is released only after the clutch means is brought into active position by pressure on the brake lever, the plate being pivoted to the brake lever, clutch operating arms engaging said cams, whereby movement of the plate, in either direction about its pivot first actuates a clutch operating arm, and then actuates the brake lever to release the brake, and vice versa upon return movement of the plate.

5. Transmission mechanism, comprising, a driving shaft, a driven shaft, a second shaft in line with the drive shaft, a friction clutch on the drive shaft and the second shaft, a gear on the second shaft driven at relatively high speed through the friction clutch, an intermediate shaft arranged parallel to the drive shaft, a second friction clutch on the intermediate shaft, and a pinion on the intermediate shaft connecting the second named friction clutch to the gear on the second shaft for driving the last said gear at relatively low speed.

6. Transmission mechanism according to claim 5, a single operating member for said friction clutches, a brake for the gear on the second shaft, and a connection between the operating member and the brake, whereby the brake is automatically released upon the placing into operation of either of the friction clutches.

In testimony whereof I affix my signature.

FRITZ DÖHLE.